US012503147B2

(12) United States Patent
Pedersen et al.

(10) Patent No.: US 12,503,147 B2
(45) Date of Patent: Dec. 23, 2025

(54) TIP LIMITING MEMBER FOR WHEELED CART AND ASSEMBLIES THEREOF

(71) Applicant: TARGET BRANDS, INC, Minneapolis, MN (US)

(72) Inventors: Sara L. Pedersen, Minneapolis, MN (US); Alex K. Poniatowski, New Hope, MN (US); Hermann Eichele, Leipheim (DE); Stefan Remmele, Offingen (DE); Dieter Stöckle, Landensberg (DE); Thomas Gasche, Leipheim (DE); Peter Irlbacher, Schwarzenfeld (DE); Johann Daminger, Neu-Ulm (DE); William Kiser, Lincolnton, NC (US)

(73) Assignee: TARGET BRANDS, INC, Minneapolis, MN (US)

( * ) Notice: Subject to any disclaimer, the term of this patent is extended or adjusted under 35 U.S.C. 154(b) by 139 days.

(21) Appl. No.: 18/383,860

(22) Filed: Oct. 25, 2023

(65) Prior Publication Data
US 2024/0132132 A1 Apr. 25, 2024
US 2024/0227904 A9 Jul. 11, 2024

Related U.S. Application Data

(60) Provisional application No. 63/419,331, filed on Oct. 25, 2022.

(51) Int. Cl.
*B62B 5/04* (2006.01)
*B62B 3/14* (2006.01)

(52) U.S. Cl.
CPC .............. *B62B 5/0404* (2013.01); *B62B 3/14* (2013.01)

(58) Field of Classification Search
CPC ........... B62B 5/0006; B62B 5/00; B62B 5/04; B62B 5/0485; B62B 5/049; B62B 9/08;
(Continued)

(56) References Cited

U.S. PATENT DOCUMENTS 1,488,061 A * 3/1924 Francis ...................... B62B 1/14
414/449
2,184,455 A * 12/1939 Johnson ................ B62B 5/0089
280/46
(Continued)

FOREIGN PATENT DOCUMENTS

CA 153457 A 2/1914
CH 630856 A * 7/1982 ........... B62B 3/1476
(Continued)

OTHER PUBLICATIONS

CH-630856-A (Year: 1982).*
(Continued)

*Primary Examiner* — Michael T. Walsh
(74) *Attorney, Agent, or Firm* — Griffiths & Seaton PLLC; JoAnn M. Seaton

(57) ABSTRACT

A shopping cart is configured to roll along a supporting surface and includes a chassis, a basket, a rear leg, a rear wheel, and a rotational brake. The basket is supported above the chassis. The rear leg extends downwardly from the chassis. The rear wheel is rotatably coupled to the rear leg and is configured to rotate about a rotational axis. The rear wheel defines an outside perimeter configured to contact and roll along the supporting surface. A rotational brake is coupled to the rear leg and extending radially away from the rotational axis in a rearward and downward direction beyond an outside perimeter of the rear wheel. The rotational brake is configured to impede rotation of the chassis and the basket about the rotational axis.

15 Claims, 10 Drawing Sheets

(58) Field of Classification Search
CPC ..... B62B 3/08; B62B 2301/0463; B62B 1/16; B62B 5/0404; B62B 3/14; B62B 3/1492; B60B 33/0078
See application file for complete search history.

(56) References Cited

U.S. PATENT DOCUMENTS

| | | | |
|---|---|---|---|
| 2,488,749 A | 11/1949 | Ulrich | |
| 3,048,420 A * | 8/1962 | Umanoff | B62B 3/12 |
| | | | 280/47.32 |
| 4,671,522 A | 6/1987 | Fragione, Jr. | |
| D294,419 S | 2/1988 | Rehrig | |
| 5,318,400 A | 6/1994 | Nijenhuis | |
| 6,098,999 A | 8/2000 | Anastasia | |
| 6,125,972 A | 10/2000 | French et al. | |
| 6,199,878 B1 | 3/2001 | Masserant et al. | |
| 6,422,580 B1 * | 7/2002 | Hunter | B62B 5/0006 |
| | | | 280/33.992 |
| 6,981,708 B1 | 1/2006 | Tucker et al. | |
| D530,478 S | 10/2006 | Splain et al. | |
| 7,192,036 B2 | 3/2007 | Schmid | |
| D540,998 S | 4/2007 | Splain et al. | |
| 7,225,903 B2 * | 6/2007 | Nebolon | B62B 5/0423 |
| | | | 188/19 |
| 7,234,711 B2 * | 6/2007 | Gordon | B62B 9/24 |
| | | | 280/47.38 |
| D546,021 S | 7/2007 | Splain et al. | |
| D550,423 S | 9/2007 | Spalin et al. | |
| D556,413 S | 11/2007 | Splain et al. | |
| D564,172 S | 3/2008 | Steinhobel | |
| 7,384,049 B2 | 6/2008 | Peota et al. | |
| 7,398,976 B2 | 7/2008 | Splain et al. | |
| D575,472 S | 8/2008 | Splain et al. | |
| 7,407,169 B2 | 8/2008 | Splain et al. | |
| 7,410,178 B2 | 8/2008 | Splain et al. | |
| 7,416,194 B2 | 8/2008 | Splain et al. | |
| D582,122 S | 12/2008 | Splain et al. | |
| 7,494,135 B2 | 2/2009 | Ash et al. | |
| D588,774 S | 3/2009 | Peota et al. | |
| D588,775 S | 3/2009 | Peota et al. | |
| D591,474 S | 4/2009 | Peota et al. | |
| 7,600,763 B2 | 10/2009 | Splain et al. | |
| D607,173 S | 12/2009 | Selvig et al. | |
| 7,766,347 B2 | 8/2010 | Ryan et al. | |
| 7,780,902 B2 | 8/2010 | Pruitt, Jr. et al. | |
| D623,374 S | 9/2010 | Splain et al. | |
| 7,793,948 B2 | 9/2010 | Splain et al. | |
| 7,857,108 B2 | 12/2010 | Amdahl et al. | |
| 7,934,740 B2 | 5/2011 | Wilmot et al. | |
| 7,959,166 B2 | 6/2011 | Splain et al. | |
| D641,532 S | 7/2011 | Peota et al. | |
| D643,175 S | 8/2011 | Peota et al. | |
| D644,810 S | 9/2011 | Peota et al. | |
| D649,732 S | 11/2011 | Muscara | |
| 8,066,291 B2 | 11/2011 | Cagan et al. | |
| 8,162,331 B2 | 4/2012 | Simonson et al. | |
| D683,102 S | 5/2013 | Muscara | |
| 8,690,166 B2 | 4/2014 | Peota et al. | |
| 9,085,314 B2 | 7/2015 | Selvig et al. | |
| D760,464 S | 6/2016 | Dyer et al. | |
| 9,637,152 B2 | 5/2017 | Dyer et al. | |
| D794,897 S | 8/2017 | Dyer et al. | |
| D796,769 S | 9/2017 | Stauff | |
| D800,986 S | 10/2017 | Magnusson | |
| D806,976 S | 1/2018 | Peota et al. | |
| 10,189,493 B2 * | 1/2019 | Grubauer | B62B 5/025 |
| D850,754 S | 6/2019 | Peota et al. | |
| 10,501,105 B2 | 12/2019 | Asbille | |
| 10,640,136 B2 | 5/2020 | Nahum et al. | |
| D905,370 S | 12/2020 | Poirier et al. | |
| 11,046,345 B2 | 6/2021 | Kawade et al. | |
| D926,414 S | 7/2021 | Villanova et al. | |
| 11,059,506 B2 | 7/2021 | Hagen et al. | |
| 11,066,090 B2 * | 7/2021 | Johnson | B62B 3/10 |
| 11,155,291 B2 | 10/2021 | Joaquin | |
| D1,004,893 S | 11/2023 | Irwin | |
| D1,049,539 S | 10/2024 | Cheng et al. | |
| D1,054,646 S | 12/2024 | Hogan et al. | |
| 2003/0057666 A1 | 3/2003 | Murar et al. | |
| 2003/0116933 A1 | 6/2003 | Nadeau et al. | |
| 2004/0046341 A1 | 3/2004 | Wilkinson | |
| 2007/0063463 A1 | 3/2007 | Splain | |
| 2007/0063464 A1 * | 3/2007 | Splain | B62B 3/144 |
| | | | 280/33.992 |
| 2007/0063465 A1 | 3/2007 | Splain | |
| 2008/0088101 A1 | 4/2008 | Ferguson | |
| 2009/0058024 A1 * | 3/2009 | Cagan | B62B 3/1468 |
| | | | 280/33.991 |
| 2009/0127830 A1 | 5/2009 | Soni et al. | |
| 2010/0276899 A1 | 11/2010 | Burdwood et al. | |
| 2015/0090539 A1 | 4/2015 | Degnan | |
| 2020/0216105 A1 | 7/2020 | Mcmurtrey et al. | |
| 2020/0247451 A1 | 8/2020 | Streicher | |
| 2021/0140513 A1 | 5/2021 | Bujold et al. | |
| 2023/0143479 A1 | 5/2023 | Hagen | |
| 2023/0146179 A1 | 5/2023 | Hagen | |
| 2023/0147385 A1 | 5/2023 | Hagen | |
| 2024/0132132 A1 | 4/2024 | Pedersen | |
| 2024/0140511 A1 | 5/2024 | Pedersen | |
| 2024/0343284 A1 | 10/2024 | Fitzwater et al. | |

FOREIGN PATENT DOCUMENTS

| | | | | |
|---|---|---|---|---|
| CH | 630856 A5 * | 7/1982 | | B62B 5/021 |
| IN | 210446 | 6/2009 | | |
| WO | WO-2014144880 A2 * | 9/2014 | | B62B 3/1492 |

OTHER PUBLICATIONS

WO-2014144880-A2 English Translation (Year: 2014).*
CH-630856-A5 English Translation (Year: 1982).*
Target shopping cart target gift card with photo of shopping cart, retrieved May 7, 2024, https://www.target.com/p/target-shopping-cart-10-target-giftcard/-/A-90247833 (Year: 2024).
Have you used Target's new wonderful shopping carts in Texas yet?, article published Aug. 22, 2023, https://knue.com/did-you-see-targets-wonderful-new-shopping-carts-have-made-it-to-texas/ (Year: 2023).
"Rabtrolley Plastic Trolley" printed from https://www.rabtrolley.com/?I=en, publicly available as early as Feb. 5, 2016, per the Internet Archive Wayback Machine at https://web.archive.org (3 pages).
"Safe-Dock Infant Seat Carrier", printed from https://premiercarts.com/BS_Safe-Dock.html Page, publicly available at least as early as Aug. 30, 2015 per the Internet Archive Wayback Machine at https://web.archive.org (2 pages).
"Safe-Seat, Elite Infant Seat" printed from https://premiercarts.com/BS_SS-Plus.html, publicly available as early as Jun. 16, 2013, per the Internet Archive Wayback Machine at https://web.archive.org (2 pages).
U.S. Appl. No. 18/383,834, filed Oct. 25, 2023, and claiming priority to Oct. 25, 2022 (30 pages).
U.S. Appl. No. 29/857,746, filed Oct. 25, 2022 (12 pages).
U.S. Appl. No. 29/857,751, filed Oct. 25, 2022 (20 pages).
U.S. Appl. No. 18/383,848, filed Oct. 25, 2023, and claims priority to Oct. 25, 2022 (38 pages).
U.S. Appl. No. 18/383,865, filed Oct. 25, 2023, and claims priority to Oct. 25, 2022 and Oct. 26, 2022 (43 pages).
U.S. Appl. No. 18/383,870, filed Oct. 25, 2023, and claims priority to Oct. 25, 2022 and Oct. 27, 2022 (36 pages).
U.S. Appl. No. 29/857,743, filed Oct. 25, 2022 (17 pages).
U.S. Appl. No. 29/857,763, filed Oct. 25, 2022 (10 pages).
U.S. Appl. No. 29/857,771, filed Oct. 25, 2022 (10 pages).
U.S. Appl. No. 29/857,773, filed Oct. 25, 2022 (10 pages).
U.S. Appl. No. 29/857,775, filed Oct. 25, 2022 (17 pages).
U.S. Appl. No. 29/857,777, filed Oct. 25, 2022 (17 pages).
U.S. Appl. No. 29/857,778, filed Oct. 25, 2022 (19 pages).
U.S. Appl. No. 29/857,781, filed Oct. 25, 2022 (47 pages).
U.S. Appl. No. 29/857,782, filed Oct. 25, 2022 (4 pages).

(56) References Cited

OTHER PUBLICATIONS

GOOGLE About This Image / Premier Carts APFS All Polymer Large Full Size Plastic Retail Shopping Carts, date published May 30, 3030 [online], [site visited Jul. 22, 2025]. Available from internet, URL: <https://tinyurl.com/yjyedxuu> (Year: 2020).

\* cited by examiner

US 12,503,147 B2

TIP LIMITING MEMBER FOR WHEELED CART AND ASSEMBLIES THEREOF

CROSS-REFERENCE TO RELATED APPLICATION

This non-provisional utility application is related to and claims priority under 35 U.S.C. 119(e) to U.S. Provisional Patent Application No. 63/419,331, filed Oct. 25, 2022, which is incorporated herein by reference.

BACKGROUND OF THE INVENTION

Stores around the world maintain fleets of shopping carts to facilitate a customer's selection, transport, and purchase of goods within those stores. Over many decades, the shape and size of shopping carts have changed to meet different models of shopping. Retailers devote considerable resources to shaping a guest's experience within a retail store to make shopping easier, more comfortable, and attractive. The impact of shopping carts on that experience is often overlooked.

Of utmost importance to retailers is the safety of the guests visiting their establishments. As such, like any other component of their store, shopping carts are preferably designed to provide the guest and children or other dependents or accompanying individuals with a safe experience. Shopping carts, unfortunately, like many other non-motorized wheeled vehicles, are prone to tipping either via accidental or intentional overload or misapplication of load to one side of the shopping cart, for example, as is commonly referred to as a wheelie, or other tipping of cart in a rotation about one of rear wheels or front wheels thereof. While education can deter guests from overloading a shopping cart, the risk of such tipping and/or guest injury from such tipping remains.

SUMMARY

A shopping cart is configured to roll along a supporting surface and includes a chassis, a basket, a rear leg, a rear wheel, and a rotational brake. The basket is supported above the chassis. The rear leg extends downwardly from the chassis. The rear wheel is rotatably coupled to the rear leg and is configured to rotate about a rotational axis. The rear wheel defines an outside perimeter configured to contact and roll along the supporting surface. A rotational brake is coupled to the rear leg and extending radially away from the rotational axis in a rearward and downward direction beyond an outside perimeter of the rear wheel. The rotational brake is configured to impede rotation of the chassis and the basket about the rotational axis. Other shopping carts, rotational brakes, shopping cart assemblies, and associated methods are also described.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention provides example embodiments and is not intended to limit the invention or the application and uses of the invention. Furthermore, there is no intention to be bound by any theory presented in the preceding background of the invention or the following detailed description of the invention. Relational terms herein such a first, second, top, bottom, etc. may be used herein solely to distinguish one entity or action from another without necessarily requiring or implying an actual such relationship or order. Directional terminology, such as "front," "back," "leading," or trailing is used with reference to the orientation in the figure(s) being described Any directional terminology is used for purposes of illustration and is in no way limiting. In addition, as used herein, the terms "about" or "substantially" apply to all numeric values or descriptive terms, respectively, and generally indicate a range of numbers or characteristics that one of skill in the art would consider equivalent to the recited values or terms, that is, having the same function or results.

Embodiments of the invention are directed to a shopping cart including an anti-tip device configured to decrease the likelihood of the shopping cart inadvertently or purposely tipping over via rotation about wheels of the shopping cart. Such tipping of the shopping cart is generally undesirable as it can, not only be dangerous to guests of the associated retail establishment, but it can also result in dumping of all products and other objects held within the shopping cart. In one example, the anti-tip device is configured to be affixed to one or both of rear wheels of the shopping cart in a manner extending radially outwardly from an axis of each rear wheel a distance larger than a radius of the rear wheel. In this manner, the anti-tip device extends at least partially beyond an outer perimeter of a corresponding, adjacent rear wheel, more specifically, in one example, in a bottom and rear quadrant of the rear wheel. Upon any rearward tipping of the shopping cart, the anti-tip device is configured to contact the support surface in a manner stopping rotation of the shopping cart about the collective rear wheel axis thereof, which, in turn, generally prevents or at least decreases continued rotation or tipping of the shopping cart.

Figure 1:
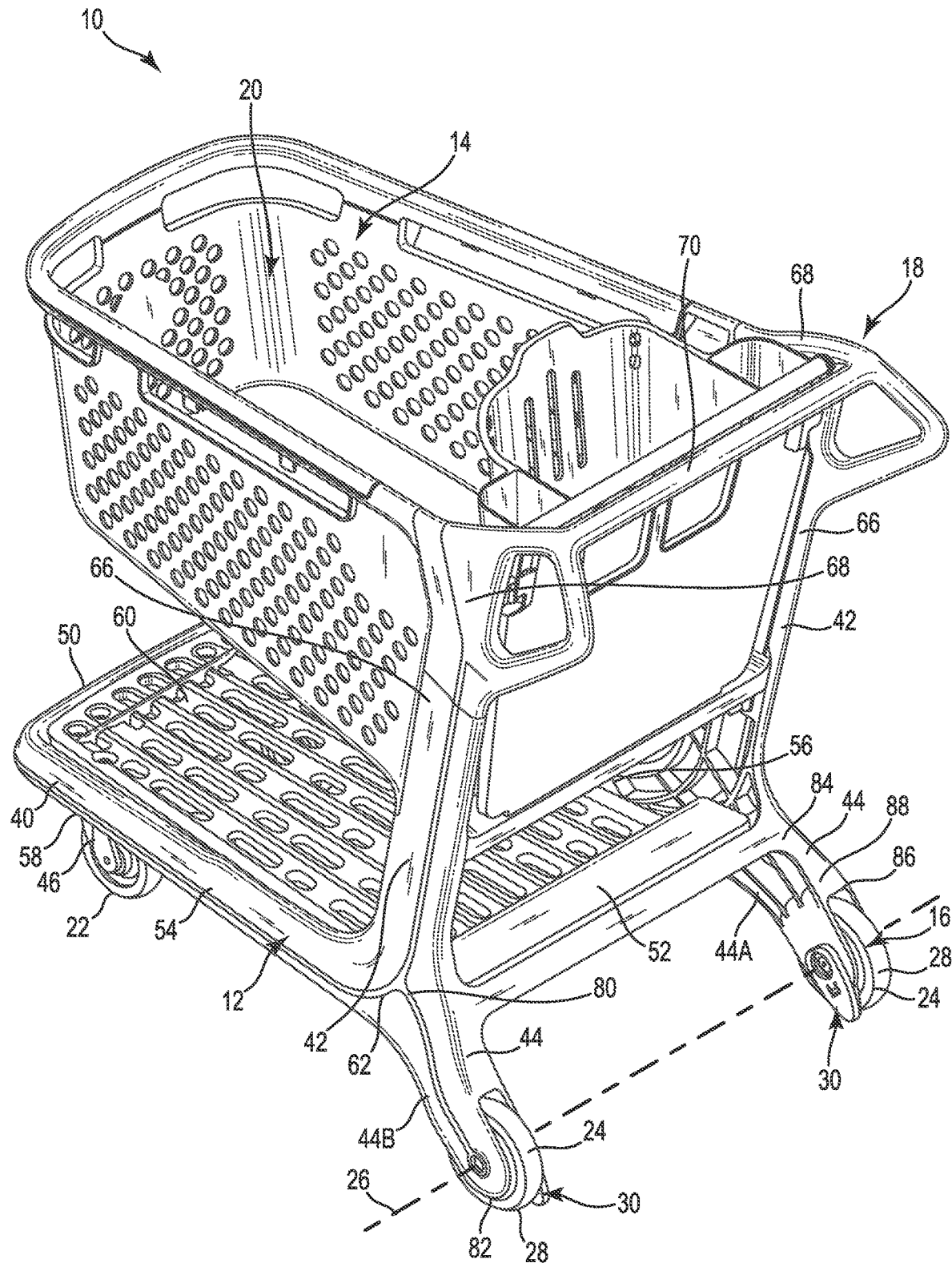
FIG. 1 is a rear perspective view illustration of a shopping cart, according to an embodiment of the invention.

Turning to the figures, FIG. 1 illustrates a shopping cart 10, according to one embodiment of the invention, for any suitable use such as for transport of items and goods, such as items being purchased from or after purchase from a retail establishment. While shopping cart can take on any variety of forms, as will be apparent to those of skill in the art upon ready the present application, the drawings illustrate one example of a shopping cart with the anti-tip device of the present invention. In the illustrated embodiment, shopping cart 10 comprises a support frame 12, a basket 14, wheels 16, and a handle assembly 18. Support frame 12 provides the overall structure and support to shopping cart 10 supporting basket 14 above wheels 16. Basket 14 defines a compartment 20 for selectively holding items as desired by a user of the shopping cart 10.

Wheels 16 extend downwardly from support frame 12 to contact a support surface 260 (FIG. 2), such as a ground surface or a floor, supporting shopping cart 10 on support surface 160 while facilitate shopping cart 10 in rolling across support surface 260. In one embodiment, wheels 16 includes both front wheels 22 and rear wheels 24 longitudinally spaced from each other extending downwardly from support frame 12, with basket 14 being supported by the support frame near a rear of shopping cart 10 such that basket 14 forwardly cantilevers over a portion of the support frame 12 extending in front of rear wheels 24.

The cantilevered design of basket 14 among other features of shopping cart 10 may contribute to the susceptibility of shopping cart 10 to tipping about a rotational axis shared with each of rear wheels 24. As such, in the present invention, shopping cart 10 additionally includes an anti-tip feature or rotational brake 30 near at least one, and in one example both, of rear wheels 24 configured to decrease shopping cart 10 from tipping beyond a predetermined angle of acceptable tipping. In one embodiment, each rotational brake 30 is configured to extend outwardly beyond an outer perimeter 28 of a corresponding, adjacent rear wheel 24 in a manner configured to contact support surface 260 before the predetermined angle of acceptable tipping is surpassed serving as a stop generally preventing additional rotation of shopping cart 10 about its shared rotational axis with rear wheels 24 as will be described in additional detail below.

Shopping cart 10 may also include a handle assembly 18 at any one of various or multiple positions on shopping cart 10 to facilitate manipulating, e.g., pushing and/or pulling, and moving shopping cart 10. As used herein and illustrated in the drawings, the front of shopping cart 10 is the portion of basket 14 that generally leads shopping cart 10 during forward movement of shopping cart 10 induced by a user pushing on handle assembly 18 toward basket 14 from a position on shopping cart 10 opposite basket 14, and the rear of shopping cart 10 is the trailing portion of basket 14 or outside basket 14 opposite front of shopping cart 10 during the above-described forward movement of shopping cart 10, for example, including handle assembly 18.

In one embodiment, support frame 12 includes a base or chassis 40, two support masts 42, two rear legs 44, and two front legs 46. Chassis 40 generally extends horizontally in any desirable size and shape, for example, in a generally elongated trapezoidal shape and is positioned between basket 14 and wheels 16 forming the main support for shopping cart 10 above supporting surface 22. In one embodiment, chassis 40 includes a front lateral support 50, a rear lateral support 52, a first longitudinal support 54, and a second longitudinal support 56 opposite first longitudinal support 54. Front lateral support 50 and rear lateral support 52 are generally positioned opposite one another, in one embodiment, and each extend to and between first longitudinal support 54 and second longitudinal support 56, which are laterally positioned opposite one another, in one example. Shopping cart 10 additionally includes a bottom tray 60 support on chassis 40, for example extending across and supported by front lateral support 50, rear lateral support 52, first longitudinal support 54, and second longitudinal support 56 of chassis 40 and configured to support items thereon, such as items that are too big for or otherwise do not fit in basket 14 as desired by the user of shopping cart 10.

An intermediate, bottom lateral support 58 extends across first longitudinal support 54 and second longitudinal support 56, in one embodiment, forming a support for receiving front legs 46, which are each rotatably coupled to one of front wheels 22. In one example, each of front legs 46 is simply a caster or something similar, allowing front wheels 22 to rotate about in a Z-axis in addition to the rotational axis of the front wheel 22 that causes translation of shopping cart 10, as will be apparent to those of skill in the art upon reading the present application.

Support masts 42 extend generally upwardly from a rear side chassis 40 to support basket 14 in a position spaced above chassis 40. In one embodiment, support masts 42 are laterally spaced apart from one another, for example, extending from opposite lateral sides of chassis 40. In one embodiment, support masts 42 extend upwardly from at or near an intersection between chassis 40 and a corresponding one of rear legs 44.

While handle assembly 18 can take on any one of a variety of configurations, in one example, handle assembly 18 is coupled to a remainder of shopping cart 10 at or near a top 66 of one or more of support masts 42. In one embodiment, handle assembly 18 includes a pair of side handles 68 with each side handle of the pair being position at top 66 of a different one of support masts 42. Additionally or alternatively, handle assembly 18 includes a laterally extending handle 70 coupled directly or indirectly to tops 66 of support masts 42, for example to each of pair of handles 68 or other portion of support frame 12. Each handle, for example pair of side handles 68 and laterally extending handle 70, are configured to facilitate a user in moving and steering, that is, in manipulating, shopping cart 10 through a retail establishment and other locals as desired.

In one embodiment, each rear leg 44, including first rear leg 44A and second rear leg 44B, extends from a top end 80 of the rear leg 44 at a different lateral side of chassis 40 as compared to the other one of rear legs 44, rearwardly and downwardly therefrom to a free or bottom end 82, which receives on of rear wheels 24. In one example, each rear leg 44 may additionally extend at laterally outwardly, that is away from the other one of rear legs 44 as it extends away from chassis 40 at top end 80 of rear leg 44 to bottom end 84 of leg 44. As illustrated, in one embodiment, each rear leg 44 extends from an intersection of one or more of first and second longitudinal supports 54, 56 and rear lateral support 52 and one of support masts 42 to bottom end 82.

In order to accommodate reception of one of rear wheels 24, in one example, rear leg 44 includes a first segment or stem 84 and a second segment or fork 86. More specifically, stem 84 extends from top end 80 toward but stopping short of bottom end 82 at an intersection 88 with fork 86. Fork 86 extends from intersection 88 to bottom end 86 in a split or forked configuration forming a first prong 90 and a second prong 92 extending substantially parallel to one another with an open channel 94 formed therebetween. First prong 90 defines an exterior surface 96 facing away from open channel 94 and an interior surface 98, opposite exterior surface 96, facing and positioned adjacent to open channel 94. Similarly, second prong 92 defines an interior surface 100 facing away from open channel 94 and an exterior-facing surface 102, opposite interior surface 100, facing and positioned adjacent to open channel 102.

Figure 13:
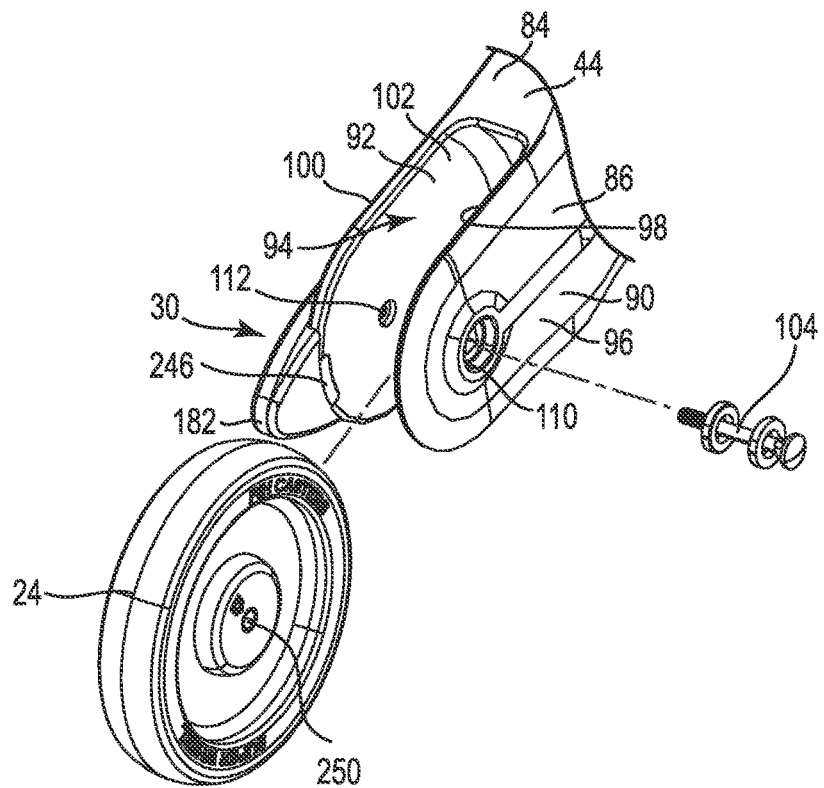
FIG. 13 is a partially exploded, perspective view illustration of a rear leg of a shopping cart, wheel, and anti-tip device, according to an embodiment of the invention.

One of rear wheels 24 is received within fork 86 of rear leg 44, more particularly between first prong 90 and second prong 92, in the illustrated embodiment. For example, additionally referring to FIG. 13, a bolt or other axle member 104 extends through each of first prong 90, a center opening 250 of the one of rear wheels 24, and the second prong 90 and is secured to and/or on each exterior surface 96 and 102, e.g., via a bolt 252 or other securement item to be rotatable or to allow wheel to rotate relative to axle 104, as will be apparent to those of skill in the art upon reading the present application.

In one embodiment, one of interior surface 100 of interior prong 92 or exterior surface 96 of exterior prong 90, that, is one of second segment 86 surfaces facing away from channel 94, includes a brake reception means or feature 114 suitable for coupling rear leg 44 with rotational brake 30. For instance, where brake reception means 114 extends from interior surface 100 of interior prong 92, brake reception means 114 includes a seating portion 120 and a linear reception track 122, in one example. Seating portion 120 is configured to fit with a corresponding feature on rotational brake 30 to facilitate holding rotational brake 30 to rear leg 44. Linear reception track 122 is configured to allow rotation brake 30 to slide onto rear leg 44 in a manner leading to the corresponding features of rotational brake sliding onto seating portion 120.

In one embodiment, seating portion 120 includes side walls 130, bridge wall 132, and end wall 134, which in one embodiment collectively form a closed wall shape around wheel axis 26. As illustrated, in one example, end wall 134 is positioned furthest inwardly from bottom end 82 of rear leg 44 and extends transversely across a width of rear leg 44. Each of side walls 130 extends from an opposite end of end wall 134 longitudinally along a length of rear leg 44 toward bottom end 82 on opposite sides of wheel axis 26, in one embodiment, and bridge wall 132 extends from the ends of side walls 130 opposite end wall 134 and on a side of wheel axis 26 opposite end wall 134 with a curvilinear or convex shape curved toward bottom end 82 between the opposite side walls 130. In this manner, a cavity 136 is defined between side walls 130, bridge wall 132, and end wall 134 around wheel axis 26. In one embodiment, a cutout or indentation 138 is formed in each side wall 130 immediately adjacent interior surface 100 of interior prong 92. In this manner, each side wall 130 effectively defines a rib 142 above each indentation 138.

In one embodiment, linear reception track 122 extends from a portion of seating portion 120 nearest bottom end 82 of rear leg 44 longitudinally down toward and to bottom end 82 of rear leg 44. Linear reception track 122, in the illustrated example, includes two parallel, transversely spaced protruding rails 150 and 152 each extending from seating portion 120 to a free end 154. Each of protruding rails 150 including an exterior surface 156 facing away from the other protruding rails and an interior surface 154 facing toward the other of the protruding rails 150. In one example, a cross bar 150 extends between the interior surfaces 154 of the two protruding rails near the bottom end of the rear leg and spaced from interior surface 100 of rear leg 92.

Figure 4:
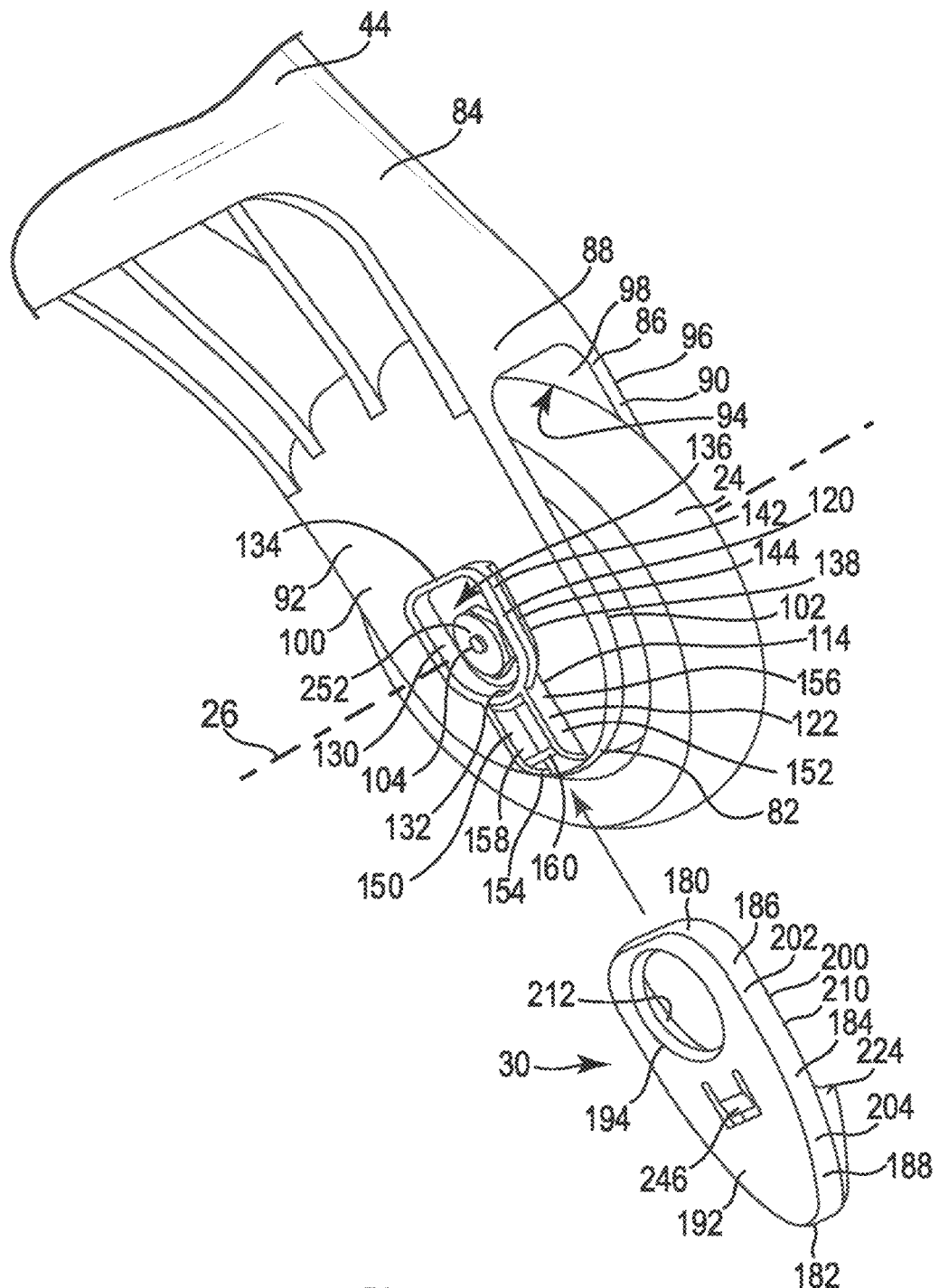
FIG. 4 is a partially exploded, detailed rear perspective view illustration of a rear leg of the shopping cart of FIG. 1 including an anti-tip device, according to an embodiment of the invention.
Figure 5:
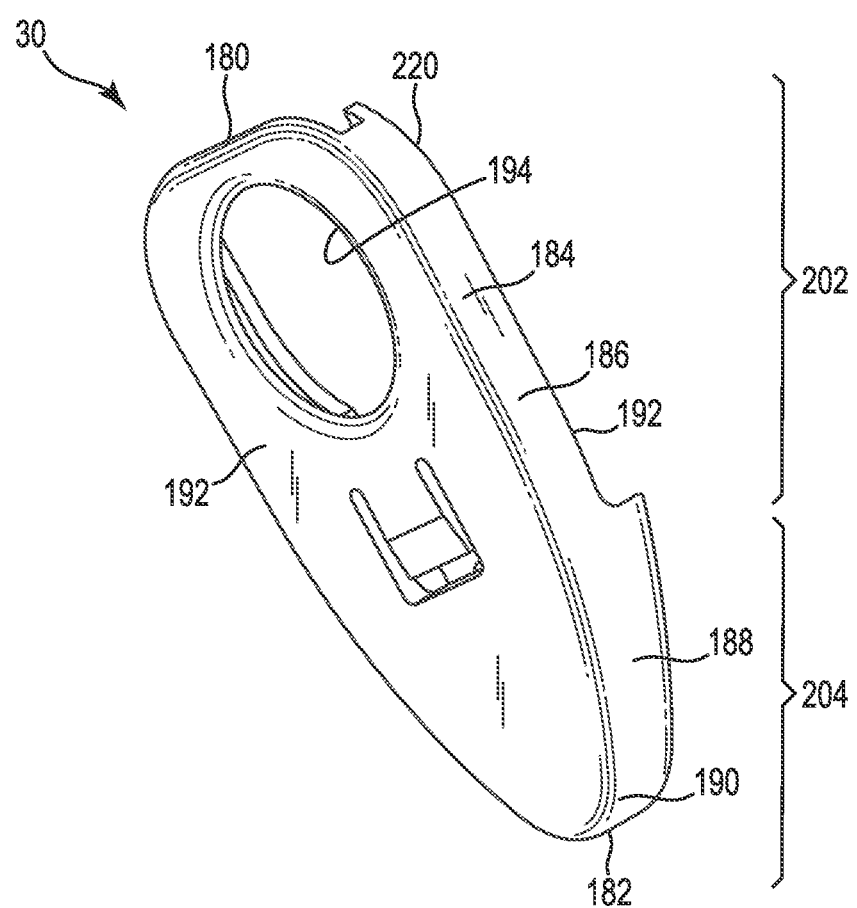
FIG. 5 is a rear perspective view illustration of the anti-tip device of FIG. 3, according to an embodiment of the invention.
Figure 6:
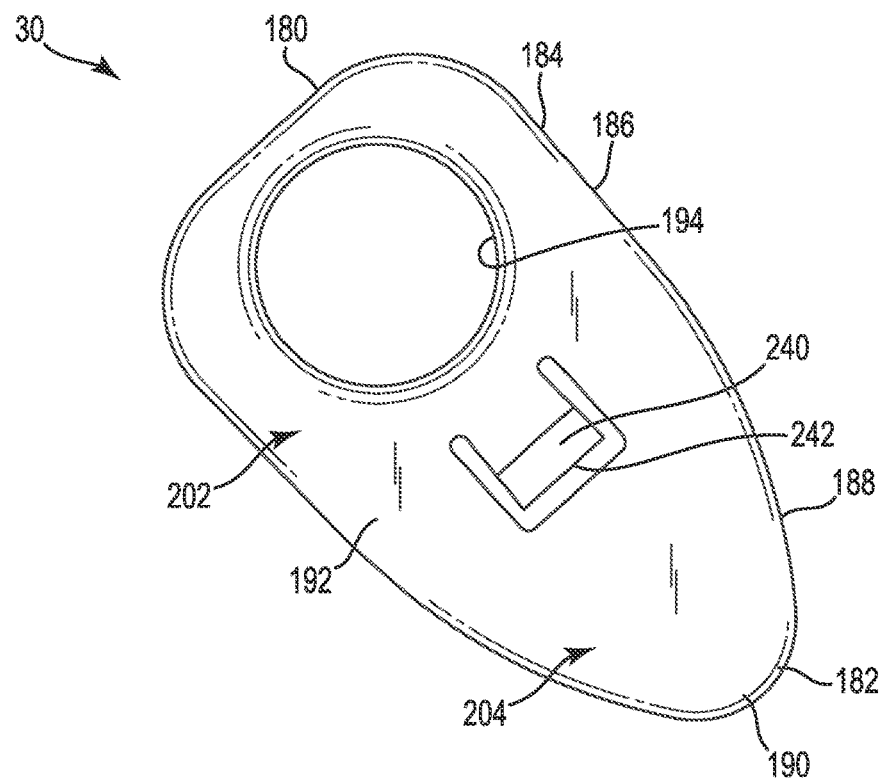
FIG. 6 is a left side view illustration of the anti-tip device of FIG. 5, according to an embodiment of the invention.
Figure 7:
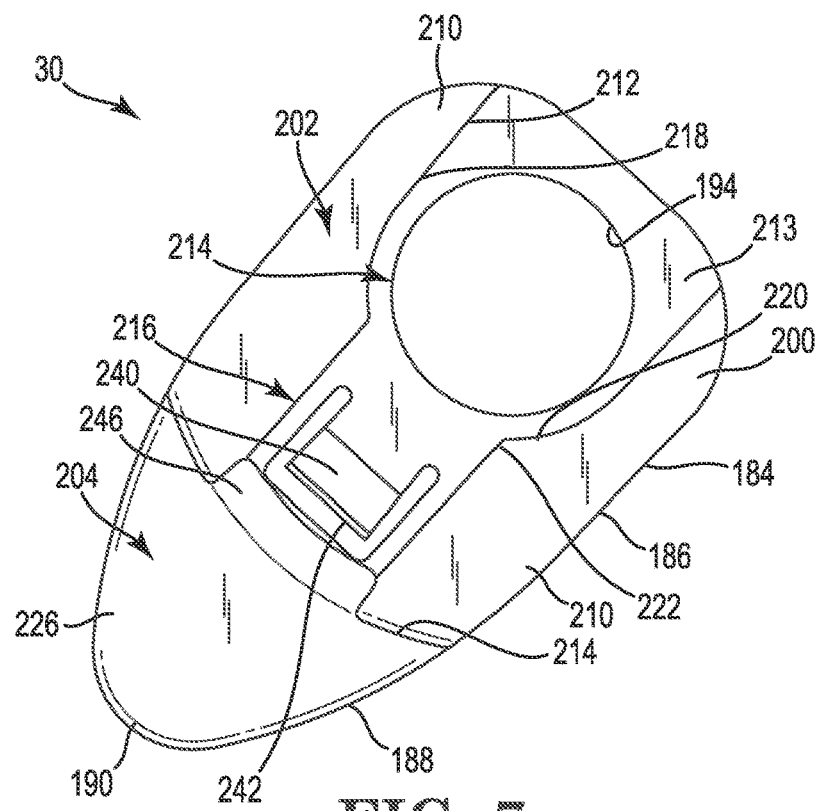
FIG. 7 is a right side view illustration of the anti-tip device of FIG. 5, according to an embodiment of the invention.
Figure 8:
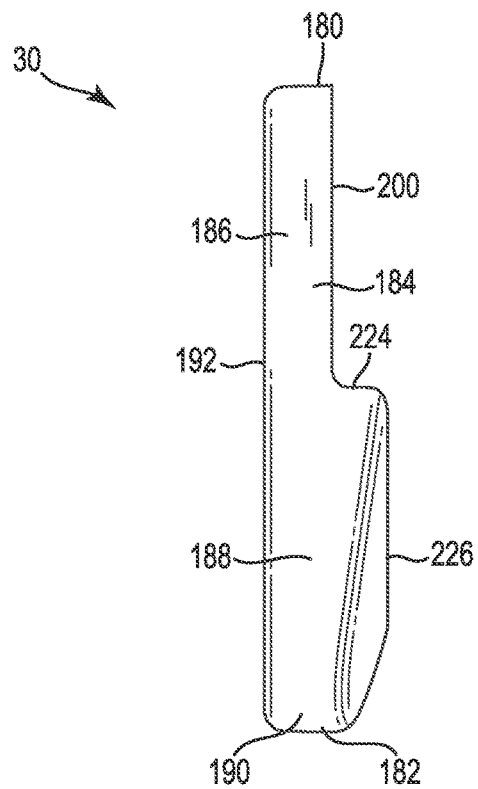
FIG. 8 is rear view illustration of the anti-tip device of FIG. 5, according to an embodiment of the invention.
Figure 9:
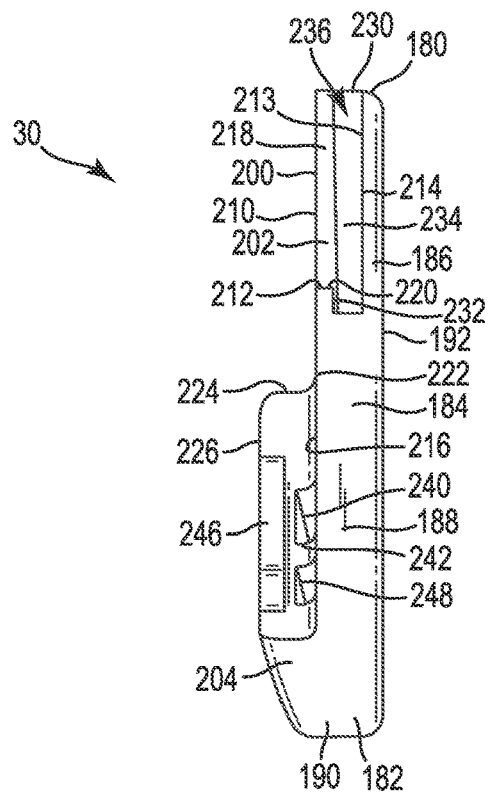
FIG. 9 is a front view illustration of the anti-tip device of FIG. 5, according to an embodiment of the invention.
Figure 10:
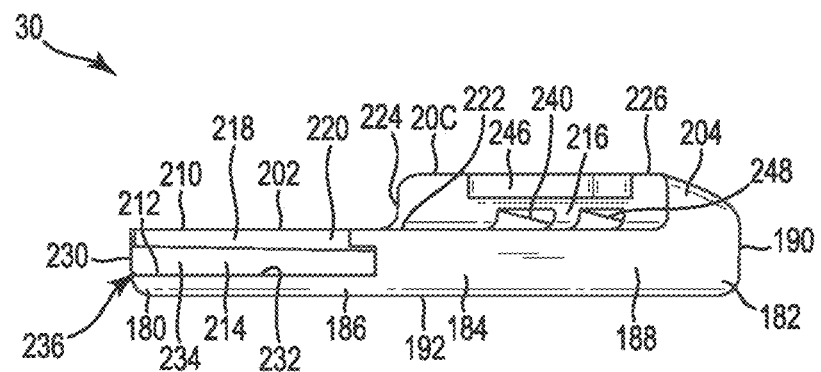
FIG. 10 is a top view illustration of the anti-tip device of FIG. 5, according to an embodiment of the invention.
Figure 11:
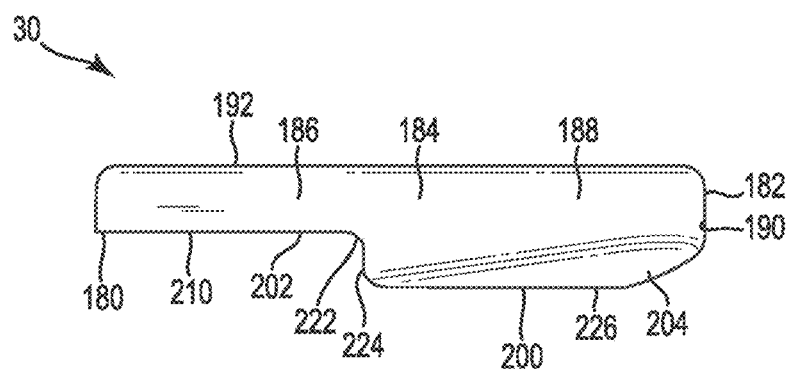
FIG. 11 is a bottom view illustration of the anti-tip device of FIG. 5, according to an embodiment of the invention.
Figure 12:
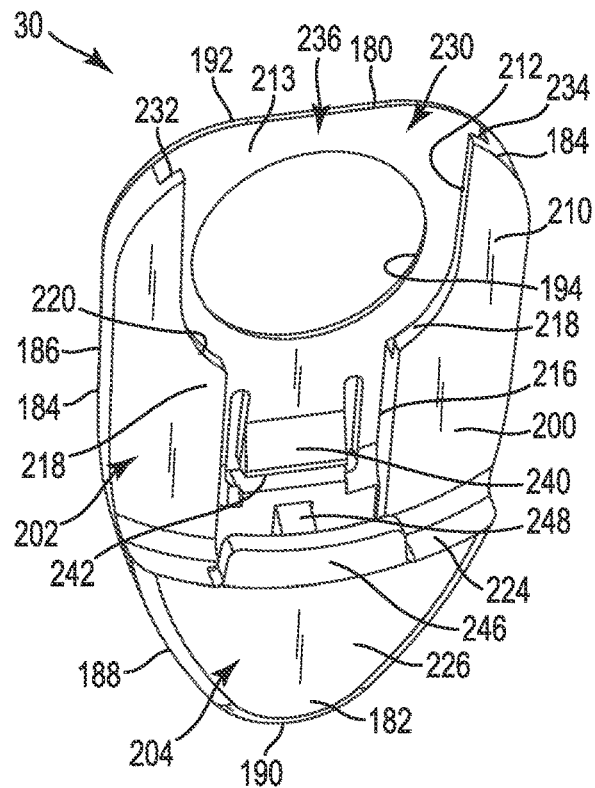
FIG. 12 is a right side perspective view illustration of the anti-tip device of FIG. 5, according to an embodiment of the invention.
Figure 14:
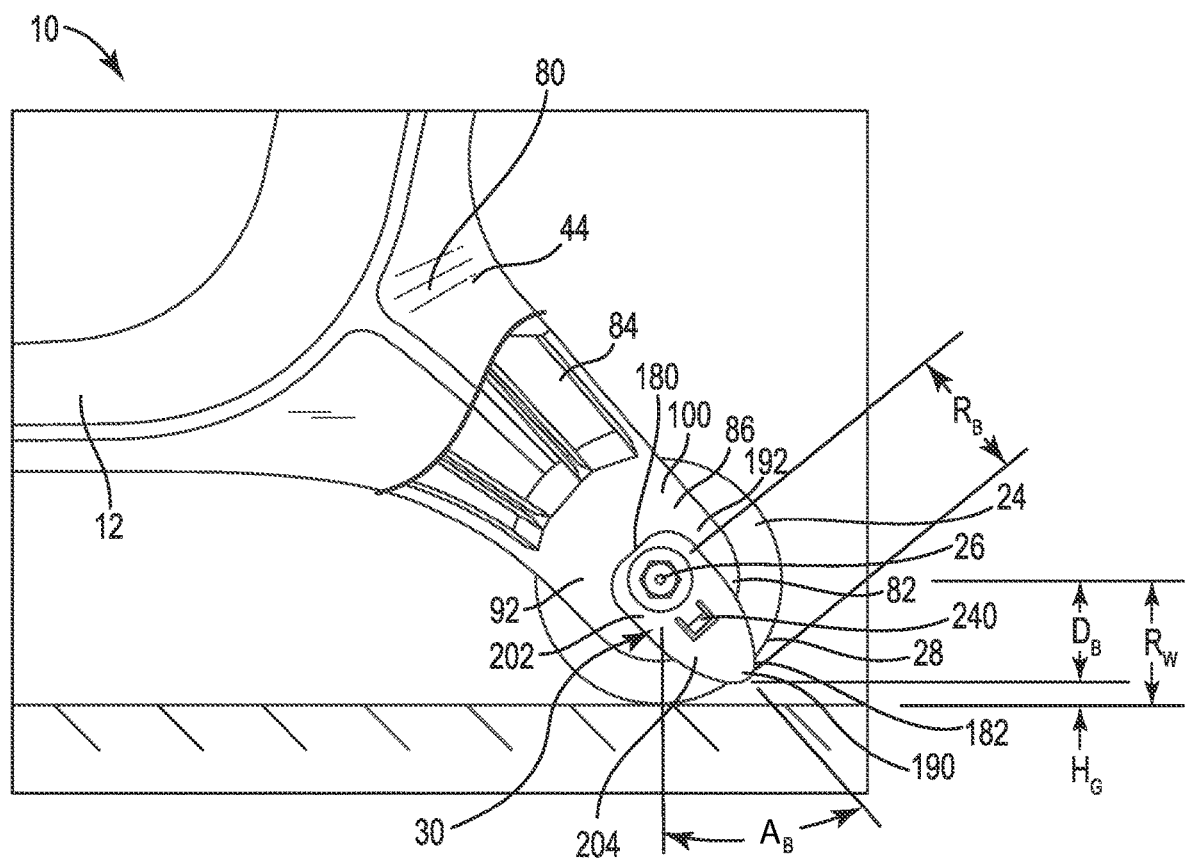
FIG. 14 is a left side view with partial cut away of a rear leg of a shopping cart with anti-tip device interacting with a support surface, according to an embodiment of the invention.

Referring to FIG. 4, rotational brake 30 is configured to slide onto rear leg 44, more specifically, along linear reception track 122 and onto seating portion 120 to couple rotational brake 30 to rear leg 44, in one embodiment. More specifically, additional reference to FIGS. 5-12 shows one embodiment of a rotational brake 30. As illustrated, rotational brake 30 has a generally planar interior facing surface 192 extending from a first end 180 to a second end 182. Opposing side walls 184 extend along opposite longitudinal sides of interior facing surface 192, substantially perpendicularly away from interior facing surface 192, from first end 180 to second end 182. In one example, each side wall 184 includes a linear portion 186 extending away from first end 180 to a tapering portion 186 that extends a remainder of the way to the second end 182. Linear portions 186 of the two opposing side walls 184 extend substantially parallel to each other, and tapering portions 186 taper toward each other to second end 182, for example, to form a rounded point 190 at second end 182. Rotation brake 30 extends a distance $R_B$ from a center of its coupling portion 202 to tip of rounded point 190 as shown in FIG. 14 that is greater than a radius of the wheel $R_W$ 24 it is braking. In one example a distance $D_B$ extends from a center of wheel 24 may be less than the radius of the wheel $R_W$ 24. In one embodiment, an aperture is formed through interior facing surface 192 between linear portions 186 of the two opposing side walls 184 and is sized, shaped, and positioned to axially align with wheel axis 26.

Rotational brake 30 additionally defines exterior facing side, which, in one embodiment, includes a coupling portion 202 and a braking portion 204, that are most easily seen with additional reference to FIGS. 6-12. Coupling portion 202 includes, according to one example, a first exterior facing surface 210, a cutout 212, and a second exterior facing surface 213. Each of first exterior facing surface 210 and second exterior facing surface 213 are substantially planar and extend substantially parallel to one another, in one embodiment. First exterior facing surface 210 is stepped in an interior direction, e.g., extends further away from interior surface 192, as compared to second exterior facing surface 213 by way of cutout 212.

In one example, cutout 212 extends around aperture 194 on either side thereof in a curvilinear segment 220 before transitioning to a linear segment or track reception portion 216 on either side of second exterior facing surface 213 toward point 190. Cutout 212 is defined via interior wall 218, which extends from first exterior facing surface 210 to second exterior facing surface 213, in one example. In embodiments, an additional indentation 234 is formed in curvilinear segment 220 of interior wall 218 extending upwardly from second exterior facing surface 213 and extending radially outwardly from adjacent portions of interior wall 218. Indentation 234 forms a second or intermediate interior facing surface 232 facing second exterior facing surface 213.

At or near the intersection 222 between seating portion 214 and track reception portion 216, in one embodiment, is an additional step outwardly from first exterior facing surface 210 occurs to a third exterior facing surface 226 in a manner forming side interior wall 224 that also serves as a stop wall 224 as will be further described below. Stop wall 224 extends substantially perpendicularly to each of first, second, and third exterior facing surface 210, 213, and 226.

In one embodiment, the arrangement of coupling portion 202 defines an open channel 230 within cutout 212, that is open at first end 180 of rotational brake 30 extends toward end 190 around aperture 194, curving toward each other on the opposite side of aperture 194 and then linearly, further toward braking portion 204 along track reception portion 216 of open channel 230. In one example, open cavity 230 additionally includes an open end 236 at first end 180 of rotational brake 30. Rotational brake 30 additionally includes a tab 240 protruding from second exterior facing surface 213 toward first prong 90 to a free, leading edge 242. In one example, a protrusion 248 extends from stop wall 224 upwardly toward first end 180, for instance, substantially centered between sidewalls 184. A ledge 246, in one embodiment, additionally extends from a position substantially coplanar with third exterior facing surface 226 over protrusion 248 spaced from both second exterior facing surface 213 and first exterior surface 210.

In one embodiment, each of support frame 12, basket 14, handle assembly 18, and/or rotational brake 30 are separately made exclusively of a plastic or other moldable material. This arrangement enables a lightweight cart while providing numerous structural, performance, and ergonomic functions. In another embodiment, one or more of support frame 12, basket 14, handle assembly 18, rotational brake 30 and/or additional components of shopping cart 10 is/are made of a material other than a plastic material, such as metal or other suitable materials as will be apparent to those of skill in the art. In one embodiment, each of support frame 12, basket 14, handle assembly 18, and/or rotational brake 30 is made from the same one or different ones of a nylon material, a high-density polyethylene (HI)PE) material, or other moldable materials or mixtures of moldable materials and/or other non-moldable materials. Still further, use of wire, metal, or any other materials to completely or partially form any one or more of support frame 12, basket 14, handle assembly 18, and/or rotational brake 30 are also contemplated as will also be apparent to those of skill in the art upon reading this application.

Referring to FIG. 4 in view of FIGS. 9-12 during assembly of rotational brake 30 with shopping cart 30, rotation brake 30 is slid onto reception means 114 on rear leg 44, for example, on interior surface 100 of second prong 92. More specifically, per the illustrated embodiment, open end 236 of open cavity 230 is aligned with reception means 114, and rotational brake 30 is slide in a direction substantially parallel to an extension of the corresponding rear leg 44 moving linear reception track 122 into track reception portion 216 and seating portion 120 between curvilinear segment 220 of cutouts 212. In one embodiment, tab 240 of rotational brake 30 latches onto cross bar 160 or rear leg 44 and/or tab 246 latches around bottom end 82 of second prong 92 of rear leg 44 to exterior surface 102 to couple rotational brake 30 to second prong 92 of rear leg 44. In one example, when rotational brake 30 is coupled with rear leg 44, a center opening 250 of rotational brake 30 extends over and aligns with rotational axis 26 and bolt 252 so that bolt 252 can be accessed if any maintenance is needed thereon after rotational brake 30 is coupled to rear leg 44. In one embodiment, the at least two-point connection, that is, at tab 246 and cross bar 160 securely maintains rotational brake 30 in place such that rotational brake 30 generally does not rotate when pressure is placed on rotational brake 30 by supporting surface 260 (FIG. 2), as will be apparent to those of skill in the art upon reading the present application.

Once shopping cart 10 is assembled to include rotational brake 30, or in one embodiment, two rotational brakes 30 with one rotational brake 30 being coupled to each rear leg 44, shopping cart 10 is configured to be supported on and roll along supporting surface 260 with both front wheels 22 and rear wheels 24 contacting supporting surface 260. Shopping cart 10 is equipped to impede tipping or rotation, for example, to move front wheels 22 up from supporting surface 260, beyond a predetermined allowed rotation about the rotational axis 26 of rear wheels 16. More specifically, referring to FIG. 2, a downward or downward rotational force F, as indicated by a so-labeled arrow in FIG. 2, applied to handle assembly 18, for example, side handles 68 and/or laterally extending handle 70 of sufficient strength to overcome the weight of shopping cart 10 and of any products or items contained in basket 14 thereof, may induce rotation R, as indicated by a so-labeled arrow in FIG. 2, of a substantial entirety of shopping cart 10 about rotational axis 26 in a clockwise direction in the orientation depicted in FIG. 2.

Figure 2:
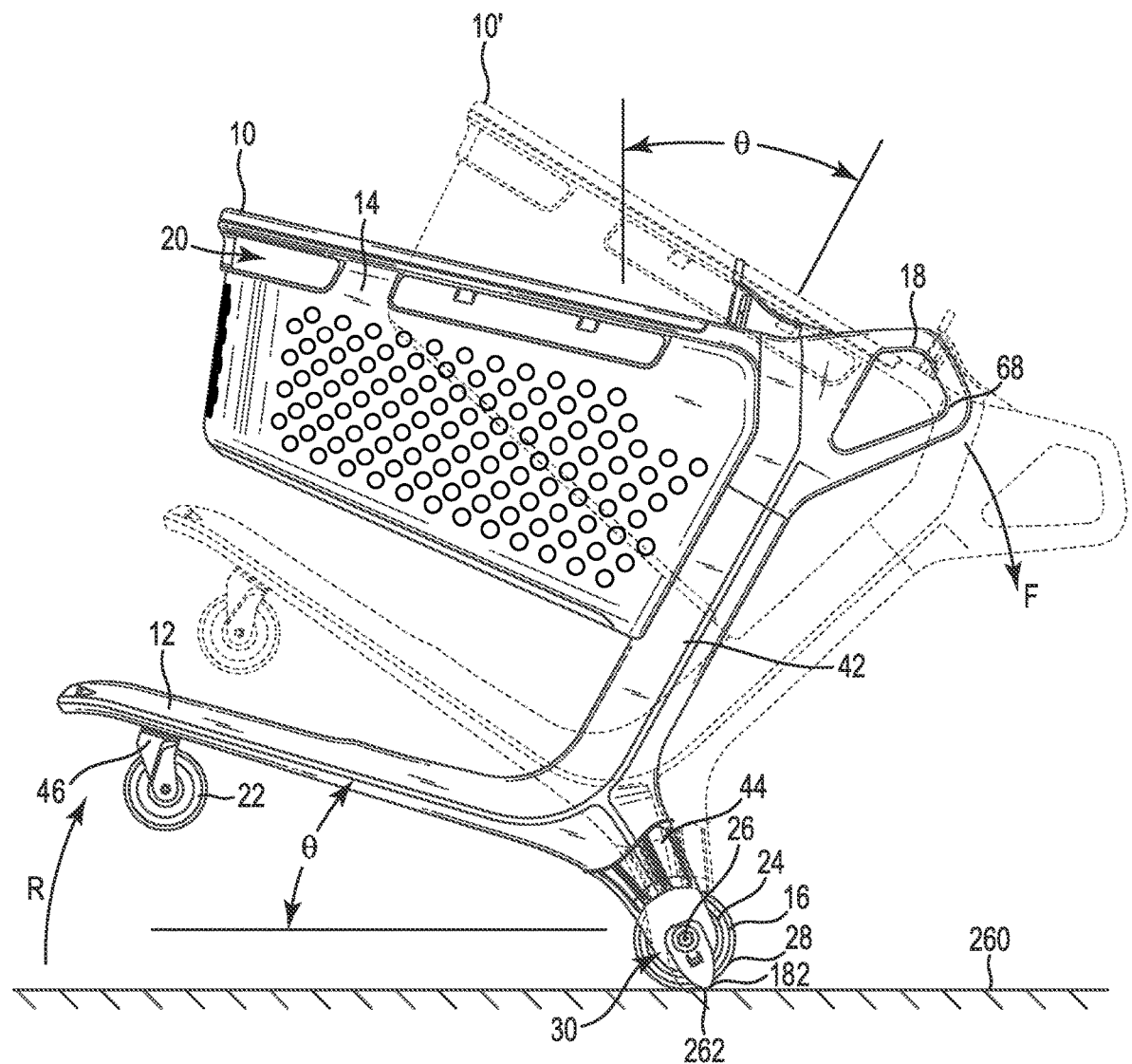
FIG. 2 is a right side view illustration of a shopping cart in a partially tipped position, according to an embodiment of the invention.
Figure 3:
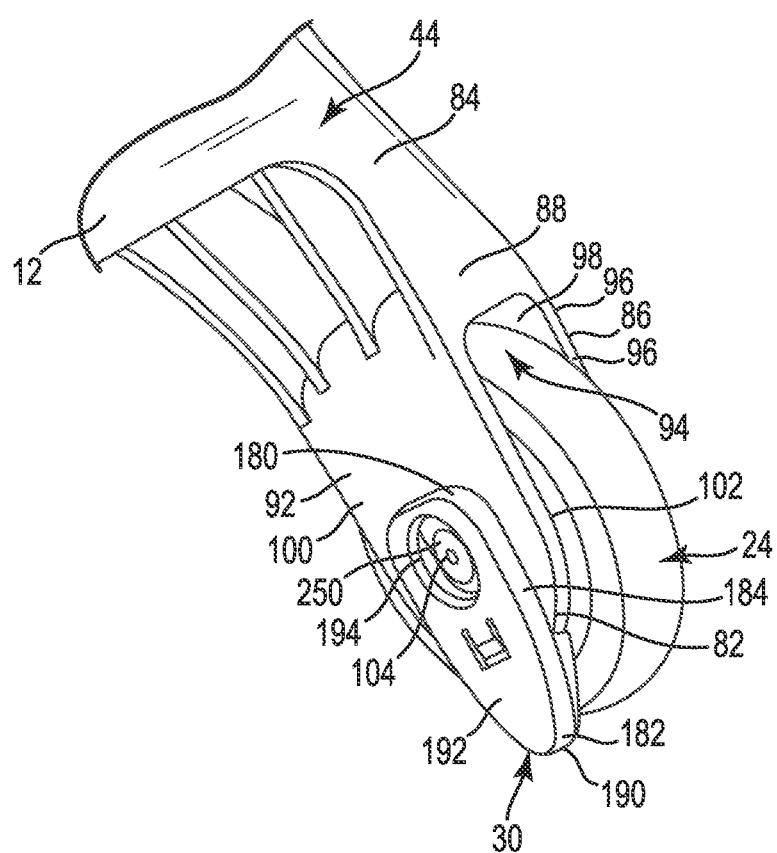
FIG. 3 is a detailed rear perspective view illustration of a rear leg of the shopping cart of FIG. 1 including an anti-tip device, according to an embodiment of the invention.

Rotation of shopping cart 10 continues about rotational axis 26 a predetermined angle θ, as generally indicated in FIG. 2, until rotation of shopping cart 10 is stopped or impeded by second end 182 of rotational brake 30 contacting supporting surface 260 at a specific point 262 of second end 182 of rotation brake 30. Each of rotational brakes 30 are securely coupled to a corresponding one of the rear legs 24 adjacent a corresponding rear wheel 24 such that each rotational brake 30 generally does not rotate about the one of rear legs 24 to which it is coupled, collectively providing a rigid stop for interacting with supporting surface 260 and stopping the continued rotation of shopping cart 10.

In one embodiment, the predetermined amount of rotation of shopping cart 10 permitted about rotational axis is set by a brake angle $A_B$ from vertical at which the rotational brake extends away from rotational axis 26 as illustrated, for example, in FIG. 14. In one example, predetermined angle θ is equal to about brake angle $A_B$ and/or both predetermined angle θ and brake angle $A_B$ have a value that is between about 10 degrees and about 45 degrees, for example, between about 10 degrees and about 35 degrees, in one embodiment. Predetermined angle θ can be set as desired by the retail establishment or designer, but in one example, is set to allow some rotation so shopping cart 10 can be tilted to clear a curb or minor obstruction in a desired way while preventing tipping or rotation of the shopping cart 10 beyond a terminal point that may cause shopping cart 10 to continue rotation to be tipped all the way on its back, e.g., on handle assembly 18, which could result in injury to any user or nearby guest to shopping cart 10 and/or products or items being spilled from shopping cart 10.

In this manner, inclusion of one or more rotational brakes 30 on shopping cart 10 functions to impede rotation or tipping of shopping cart 10 beyond a predetermined allowed rotation in order to decrease the likelihood of excessive rotation, that is rotation that may cause injury to individuals adjacent shopping cart 10, disturbance of property near shopping cart 10, and/or dumping and/or damage of products from shopping cart 10. Other modifications and/or orientations of rotational brake 30 will be apparent to those of skill in the art upon reading the present application to achieve the advantages as described herein.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A shopping cart configured to roll along a supporting surface, the shopping cart comprising:
   a chassis;
   a basket supported above the chassis;
   a rear leg extending downwardly from the chassis;
   a rear wheel rotatably coupled to the rear leg and configured to rotate about a rotational axis, the rear wheel defining an outside perimeter configured to contact and roll along the supporting surface; and
   a rotational brake coupled to the rear leg and extending radially away from the rotational axis in a rearward and downward direction beyond an outside perimeter of the rear wheel, and wherein the rotational brake is configured to impede rotation of the chassis and the basket about the rotational axis;
   wherein the rear leg defines a first surface and a reception means protruding from the first surface of the rear leg, the rotational brake is coupled to the rear leg via the reception means, the reception means includes a seating portion and a coupling portion, and the rotational brake is slid over the coupling portion and onto the seating portion to couple the rotational brake to the rear leg.

2. The shopping cart of claim 1, wherein:
   the shopping cart includes a front wheel positioned below the chassis and positioned to contact and roll along the supporting surface when the rear wheel contacts and rolls along the supporting surface when the shopping cart is in a normal use orientation;
   the rotational brake extends radially away from the rotational axis to a free end, and the free end stops short of contacting the supporting surface when the shopping cart is in the normal use orientation; and
   when the shopping cart is rotated rearwardly about the rotational axis, the front wheel is lifted away from the supporting surface, and upon continued rotation of the shopping cart, the free end of the rotation brake is configured to contact the supporting surface to impede further rotation of the shopping cart about the rotational axis.

3. The shopping cart of claim 1, wherein a line that extends between a rearward most end point of the rotational brake, when the front wheels are in contact with the supporting surface, and the rotational axis of the rear wheel forms an angle between about 10 degrees and about 35 degrees from a line that extends between a bottom most point of the rear wheel contacting the supporting surface and the rotational axis of the rear wheel.

4. The shopping cart of claim 1, wherein the rotational brake includes an indentation configured to slidably receive the coupling portion of the rear leg.

5. The shopping cart of claim 4, wherein:
   the rotational brake includes a tab protruding from the indentation,
   the reception means includes:
      two parallel tracks extending radially away from the rotational axis, and
      a cross bar extending between the two parallel tracks, and
   the tab is coupled to the cross bar securing the rotational brake to the rear wheel via the reception.

6. The shopping cart of claim 1, wherein the rotation brake is coupled to the rear leg to extend around the rotational axis in the rearward and downward direction beyond the outside perimeter of the rear wheel to an end point of the rotation brake.

7. The shopping cart of claim 6, wherein a line that extends between a rearward most end point of the rotation brake, when the front wheels are in contact with the supporting surface, and the rotational axis of the rear wheels forms an angle of about 10 degrees and about 35 degrees with a line that extends between a bottom most point of the rear wheel contacting the supporting surface and the rotational axis of the rear wheel.

8. The shopping cart of claim 6, wherein the end point of the rotation brake is positioned above the bottommost point of the rear wheel contacting the supporting surface when the supporting surface is substantially horizontal and the front wheels and the rear wheels of the shopping cart are in contact with the supporting surface.

9. The shopping cart of claim 6, wherein when the shopping cart is rotated about the rotational axis of the rear wheels, the front wheels are lifted from the supporting surface, and rotation of the shopping cart is stopped when the shopping cart is rotated to move the end point of the rotational brake to contact the supporting surface.

10. A shopping cart configured to roll along a supporting surface, the shopping cart comprising:
    a rear leg;
    a rear wheel rotatably coupled to the rear leg and configured to rotate about a rotational axis, the rear wheel defining an outside perimeter configured to contact and roll along the supporting surface; and
    a rotational brake coupled to the rear leg and extending radially away from the rotational axis in a rearward and downward direction beyond an outside perimeter of the rear wheel, and wherein the rotational brake is configured to impede rotation of the shopping cart about the rotational axis;
    wherein:
    when the shopping cart is translated along the supporting surface during normal use, the shopping cart is in a normal use orientation,
       the rotational brake extends radially away from the rotational axis to a free end, and the free end stops short of contacting the supporting surface when the shopping cart is in the normal use orientation,
       when the shopping cart is rotated rearwardly about the rotational axis the free end of the rotation brake contacts the supporting surface to impede further rotation of the shopping cart about the rotational axis,
       the rear leg defines a first surface and a reception means protruding from the first surface of the rear leg,
       the rotational brake is coupled to the rear leg via the reception means; and
    the reception means includes a seating portion and a coupling portion,
    the rotational brake is slid over the coupling portion and onto the seating portion to couple the rotational brake to the rear leg.

11. The shopping cart of claim 10, wherein the rotational brake includes an indentation configured to slidably receive the coupling portion of the rear leg.

12. The shopping cart of claim 11, wherein:
    the rotational brake includes a tab protruding from the indentation,
    the reception means includes:
       two parallel tracks extending radially away from the rotational axis, and a cross bar extending between the two parallel tracks, and the tab is coupled to the cross bar securing the rotational brake to the rear wheel via the reception.

13. The shopping cart of claim 12, wherein the rotation brake is coupled to the rear leg to extend around the rotational axis in the rearward and downward direction beyond the outside perimeter of the rear wheel to an end point of the rotation brake.

14. The shopping cart of claim 13, wherein a line that extends between a rearward most the end point of the rotation brake, when the front wheels are in contact with the supporting surface, and the rotational axis of the rear wheel forms an angle between about 10 degrees and about 35 degrees with a line that extends between a bottom most point of the rear wheel contacting the supporting surface and the rotational axis of the rear wheel.

15. A method of limiting tipping of a shopping cart, the method comprising:
  providing a rotational brake on a shopping cart, the shopping cart including:
    a chassis,
    a basket supported above the chassis,
    a rear leg extending downwardly from the chassis, wherein the rear leg defines a first surface and a reception means protruding from the first surface of the rear leg,
    a rear wheel rotatably coupled to the rear leg and configured to rotate about a rotational axis, the rear wheel defining an outside perimeter configured to contact and roll along the supporting surface, and
    wherein the rotational brake is coupled to the rear leg via the reception means and extends radially away from the rotational axis in a rearward and downward direction beyond an outside perimeter of the rear wheel to a free end, the reception means includes a seating portion and a coupling portion, and the rotational brake is slid over the coupling portion and onto the seating portion to couple the rotational brake to the rear leg; and
  impeding rotation of the chassis and the basket about the rotational axis via the free end contacting the supporting surface after a predetermined amount of allowed rotation of the chassis and basket about the rotation axis.

* * * * *